US007336932B2

(12) United States Patent
Takikita

(10) Patent No.: US 7,336,932 B2
(45) Date of Patent: Feb. 26, 2008

(54) NARROW BAND COMMUNICATION VEHICLE-MOUNTED APPARATUS

(75) Inventor: Mamoru Takikita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 727 days.

(21) Appl. No.: 09/931,581

(22) Filed: Aug. 17, 2001

(65) Prior Publication Data

US 2002/0102943 A1    Aug. 1, 2002

(30) Foreign Application Priority Data

Jan. 26, 2001    (JP)    ............... 2001-018604

(51) Int. Cl.
  H04B 1/34    (2006.01)
  G08G 1/09    (2006.01)
  G08G 1/00    (2006.01)
(52) U.S. Cl. .................. 455/99; 340/905; 340/928; 455/67.11
(58) Field of Classification Search ........... 340/928, 340/905, 447, 505, 572.1; 455/434, 99, 67.11; H04B 7/26; G07B 15/00
See application file for complete search history.

(56) References Cited

U.S. PATENT DOCUMENTS

| 4,392,242 | A | * | 7/1983 | Kai ..................... 455/450 |
| 4,903,320 | A | * | 2/1990 | Hanawa ................ 455/434 |
| 5,537,105 | A | * | 7/1996 | Marsh et al. ........... 340/10.32 |
| 5,554,984 | A | * | 9/1996 | Shigenaga et al. ...... 340/937 |
| 5,581,249 | A | * | 12/1996 | Yoshida ................ 340/928 |
| 5,771,008 | A | * | 6/1998 | Hayashi et al. ......... 340/905 |
| 5,805,082 | A | * | 9/1998 | Hassett ................. 340/928 |
| 5,825,299 | A | * | 10/1998 | Fuentes et al. .......... 340/10.42 |
| 5,933,097 | A | * | 8/1999 | Sakurai et al. .......... 340/928 |
| 5,952,940 | A | * | 9/1999 | Matsumoto ............. 340/905 |
| 6,097,292 | A | * | 8/2000 | Kelly et al. ............ 340/572.7 |
| 6,140,941 | A | * | 10/2000 | Dwyer et al. ........... 340/928 |
| 6,252,524 | B1 | * | 6/2001 | Takikita ................ 340/933 |
| 6,300,882 | B1 | * | 10/2001 | Inoue ................... 340/933 |
| 6,339,381 | B1 | * | 1/2002 | Takikita ................ 340/901 |
| 6,381,457 | B1 | * | 4/2002 | Carlsson et al. ........ 455/435.2 |
| 6,426,706 | B1 | * | 7/2002 | King ................... 340/903 |

(Continued)

FOREIGN PATENT DOCUMENTS

JP    07-312771    11/1995

(Continued)

Primary Examiner—Fan Tsang
Assistant Examiner—Lisa Hashem
(74) Attorney, Agent, or Firm—Sughrue Mion, PLLC

(57) ABSTRACT

The present invention provides a narrow band communication vehicle-mounted apparatus capable of performing communication in which there are normally no discrepancies with on-road systems when the apparatus starts up. The narrow band communication vehicle-mounted apparatus comprising: a radiocommunication portion 2 for sending and receiving with an on-road device via an antenna 1, a field intensity measuring portion 3 for detecting a radio field intensity, a control microcomputer 4 for controlling various equipment and a nonvolatile memory 5, wherein the control microcomputer 4 stores in the nonvolatile memory 5 randomly generated communication registration identification data when communication is opened or when the apparatus starts up, and communication is performed using communication registration identification data stored in the nonvolatile memory 5 in a case where the radio field intensity is in a communication range when the apparatus starts up.

4 Claims, 5 Drawing Sheets

U.S. PATENT DOCUMENTS

| | | | |
|---|---|---|---|
| 6,493,557 B1 * | 12/2002 | Yoshida | 455/456.3 |
| 6,590,506 B1 * | 7/2003 | Oouchi | 340/933 |
| 6,597,278 B1 * | 7/2003 | Ando | 340/5.25 |
| 6,657,554 B1 * | 12/2003 | Terashima et al. | 340/928 |
| 6,959,177 B1 * | 10/2005 | Oouchi | 455/254 |
| 7,142,811 B2 * | 11/2006 | Terranova et al. | 455/41.1 |
| 2001/0046861 A1 * | 11/2001 | Attimont et al. | 455/434 |
| 2004/0212517 A1 * | 10/2004 | Inoue | 340/905 |

FOREIGN PATENT DOCUMENTS

| | | |
|---|---|---|
| JP | 8-221611 | 8/1996 |
| JP | 2001022978 A * | 1/2001 |
| JP | 2002057615 A * | 2/2002 |

\* cited by examiner

NARROW BAND COMMUNICATION VEHICLE-MOUNTED APPARATUS

BACKGROUND OF THE INVENTION

1. Field of the Invention

The present invention relates to narrow band communication vehicle-mounted apparatus for use in advanced road traffic systems and the like, and in particular, to a narrow band communication vehicle-mounted apparatus that can perform communication in which there are normally no discrepancies with on-road systems.

2. Description of the Related Art

A system which is beneficial for drivers and on-road systems administrators is brought about by performing communication, using narrow band communication (DSRC Dedicated Short Range Communication), between an on-road device provided on a road and vehicle-mounted apparatus provided in an automotive vehicle and exchanging various types of data.

Regarding the narrow band communication vehicle-mounted apparatus used in this system, to say nothing of a conventional narrow band communication vehicle-mounted apparatus which does not have nonvolatile memory, even when the apparatus does have memory temporarily, communication registration identification data is not saved. For example, in the case where the narrow band communication vehicle-mounted apparatus goes down while the vehicle is traveling, when the device starts up it re-performs narrow band communication using communication registration identification data generated when the power source was started or when communication was commenced.

On the other hand, in conventional narrow band communication vehicle-mounted apparatus having nonvolatile memory, an identification number of the on-road device is also stored in the nonvolatile memory and classificatory discrepancies of on-road device are determined from an identification number of the on-road device during communication, and it is determined whether communication registration identification data is newly generated or saved communication registration identification data is continued and used. For example, in a case where the same type of on-road device is present when the vehicle-mounted apparatus starts up as when it went down, the saved communication registration identification data is continued and used.

Furthermore, in another conventional narrow band communication vehicle-mounted apparatus, to say nothing of conventional narrow band communication vehicle-mounted apparatus which does not have nonvolatile memory, even when the apparatus does have memory temporarily, a communication frequency is not stored. When the apparatus is started, a procedure which is predetermined by a control program and the like in the apparatus is followed and a new frequency is selected. When this new frequency is selected, generally, whether or not communication is possible at a first candidate frequency is determined. If it is possible, communication is performed at this frequency, if it is not possible, a second candidate frequency and so on are checked and a frequency at which communication is possible is selected. That is, for example, first whether or not communication is possible at a preset lowest frequency is checked and then sequentially higher frequencies are checked.

In narrow band communication with such a system, (radio) waves are reflected by wall and pillars and the like included in the system and such wave reflection causes waves to leak into an adjacent communication area of the on-road device. Adjacent on-road devices have different radio frequencies so that communication does not become crossed. However, when there is this type of wave leakage, it may become possible for the vehicle-mounted apparatus to communicate with both adjacent on-road devices.

FIG. 5 is a diagram explaining this condition. In FIG. 5, in the exit-side on-road system, waves transmitted from an on-road antenna are reflected at side walls of the exit-side on-road system and leak into the entrance-side communication area. Thus, a portion of communication for the exit-side is present in the entrance-side communication area.

In conventional narrow band communication vehicle-mounted apparatuses, when, in the communication area of the on-road device performing transmission (called the normal-side: concretely, the entrance-side in FIG. 5), the vehicle-mounted device starts up after having gone down due to engine stall and the like, the vehicle-mounted device may use newly generated communication registration identification data to communicate with a different on-road device than before it went down (the wave reflection-side, herein below called the leakage-side: concretely, the exit-side in FIG. 5).

In such an event, since, in the normal-side on-road device which performs communication after the leakage-side on-road device has finished communication, the communication registration identification data of the narrow band communication vehicle-mounted apparatus differ from before the vehicle-mounted apparatus went down, the on-road device recognizes it as a new vehicle-mounted apparatus and restarts communication. Hence, there is a problem in that when the vehicle-mounted apparatus starts up after having gone down, it may be recognized as a different vehicle-mounted apparatus (a different automotive vehicle) at normal-side on-road device.

In storing the above communication registration identification data and identification number, a similar problem also occurs in the vehicle-mounted apparatus whether, taking into consideration the identification number of the on-road device during communication, it determines that communication registration identification data should be newly generated or saved data should be continued and used. For example, as shown is FIG. 5, when adjacent on-road systems have different functions (for example, an exit and an entrance for highway toll collection), in the case where, while communicating with the normal-side on-road equipment or having started up after having gone down after communication, the narrow band communication vehicle-mounted apparatus communicates with the leakage-side on-road device, communication registration identification data is newly generated for the normal operation of "end of entrance, exit", and there is a problem in that the normal-side on-road equipment will recognize the vehicle-mounted apparatus as being a different apparatus. Also, when observing the same thing from the perspective of the leakage-side on-road system, there is a problem in that a narrow band communication vehicle-mounted apparatus is present in an area that it should not be for normal communication and a processing error occurs.

In a case where there is wave leakage to the communication area of an adjacent on-road device due to wave reflection such as above, communication becomes possible with both on-road devices in conventional narrow band communication vehicle-mounted apparatuses. Although radio frequencies at adjacent on-road antennas differ, in this condition, communication with both on-road devices becomes possible (FIG. 5). Here, when, in the communication area of the on-road device performing transmission, the vehicle-mounted device restarts after having gone down due to engine stall and the like, a microcomputer control program does not select a radio frequency by a predetermined procedure and communication may occur with a different on road device than before the apparatus went down. Thus, there is a problem in that, from the perspective of the leakage-side on-road system, a narrow band communication vehicle-mounted apparatus is present in an area that it should not be for normal communication and a processing error occurs. Also, since time is required for communication with the leakage-side on-road system which is a different system than before the vehicle-mounted apparatus went down, there is a problem in that there is a delay before communication is reopened with the normal-side device with which the vehicle-mounted apparatus communicated before it went down and communications processing of a (data) string is not finished in the communication area.

SUMMARY OF THE INVENTION

The present invention aims to solve the above problems with the conventional art and an object of the present invention is to provide a narrow band communication vehicle-mounted apparatus which may perform communication in which there are normally no discrepancies with on-road systems when the apparatus starts up.

According to one aspect of the present invention there is provided a narrow band communication vehicle-mounted apparatus comprising: a radiocommunication portion for sending and receiving with an on-road device via an antenna, a field intensity measuring portion for detecting a radio field intensity, a control microcomputer for controlling various equipment and a nonvolatile memory, wherein the control microcomputer stores in the nonvolatile memory randomly generated communication registration identification data when communication is opened or when the apparatus starts up, and communication is performed using communication registration identification data stored in the nonvolatile memory in a case where the radio field intensity is in a communication range when the apparatus starts up.

According to another aspect of the present invention there is provided a narrow band communication vehicle-mounted apparatus comprising: a radiocommunication portion for sending and receiving with an on-road device via an antenna, a frequency control portion for setting send and receive frequencies, a control microcomputer for controlling various equipment and a nonvolatile memory, wherein the control microcomputer saves in the nonvolatile memory a radio frequency at which communication was performed, and communication is performed selecting the radio frequency saved in the nonvolatile memory as a first candidate when the apparatus starts up.

DETAILED DESCRIPTION OF THE PREFERRED EMBODIMENTS

Embodiment 1

Figure 1:
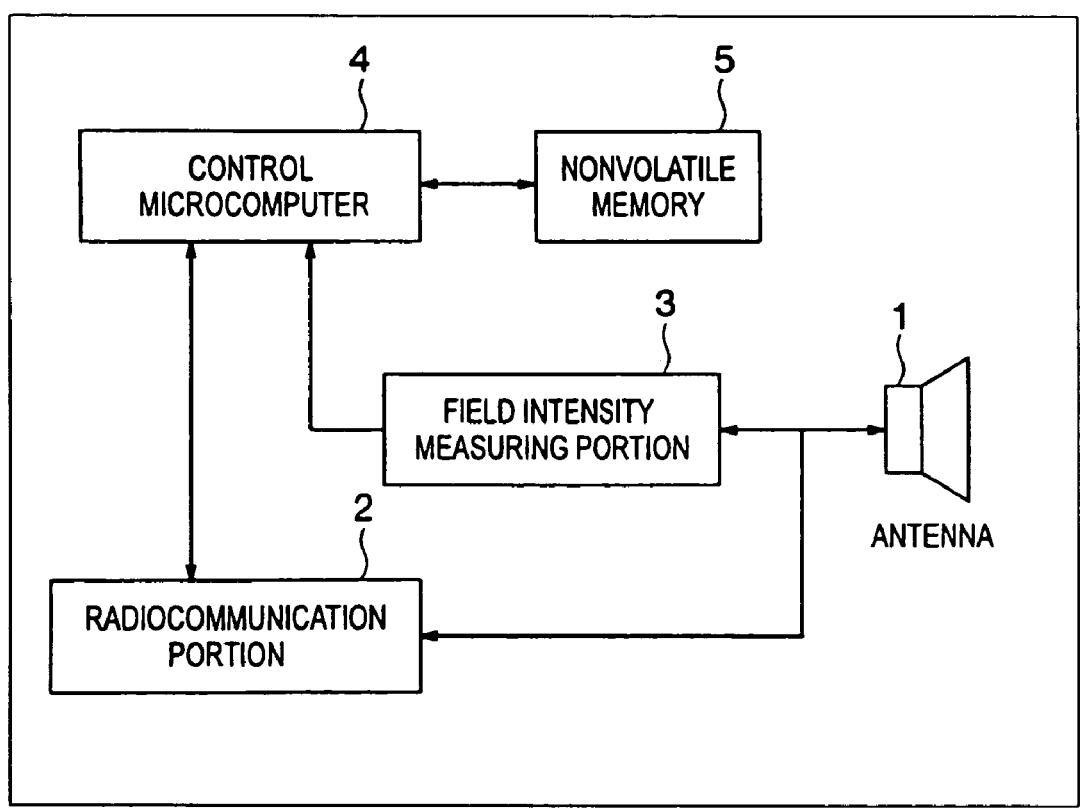
FIG. 1 is a block diagram showing a narrow band communication vehicle-mounted apparatus according to the present embodiment.

FIG. 1 is a block diagram showing a narrow band communication vehicle-mounted apparatus according to the present embodiment. In FIG. 1, a narrow band communication vehicle-mounted apparatus 100 includes an antenna 1, radiocommunication portion 2 for sending and receiving with an on-road device via the antenna 1, a field intensity measuring portion 3 for detecting a radio field intensity, a control microcomputer 4 for controlling various equipment and a nonvolatile memory 5.

Figure 2:
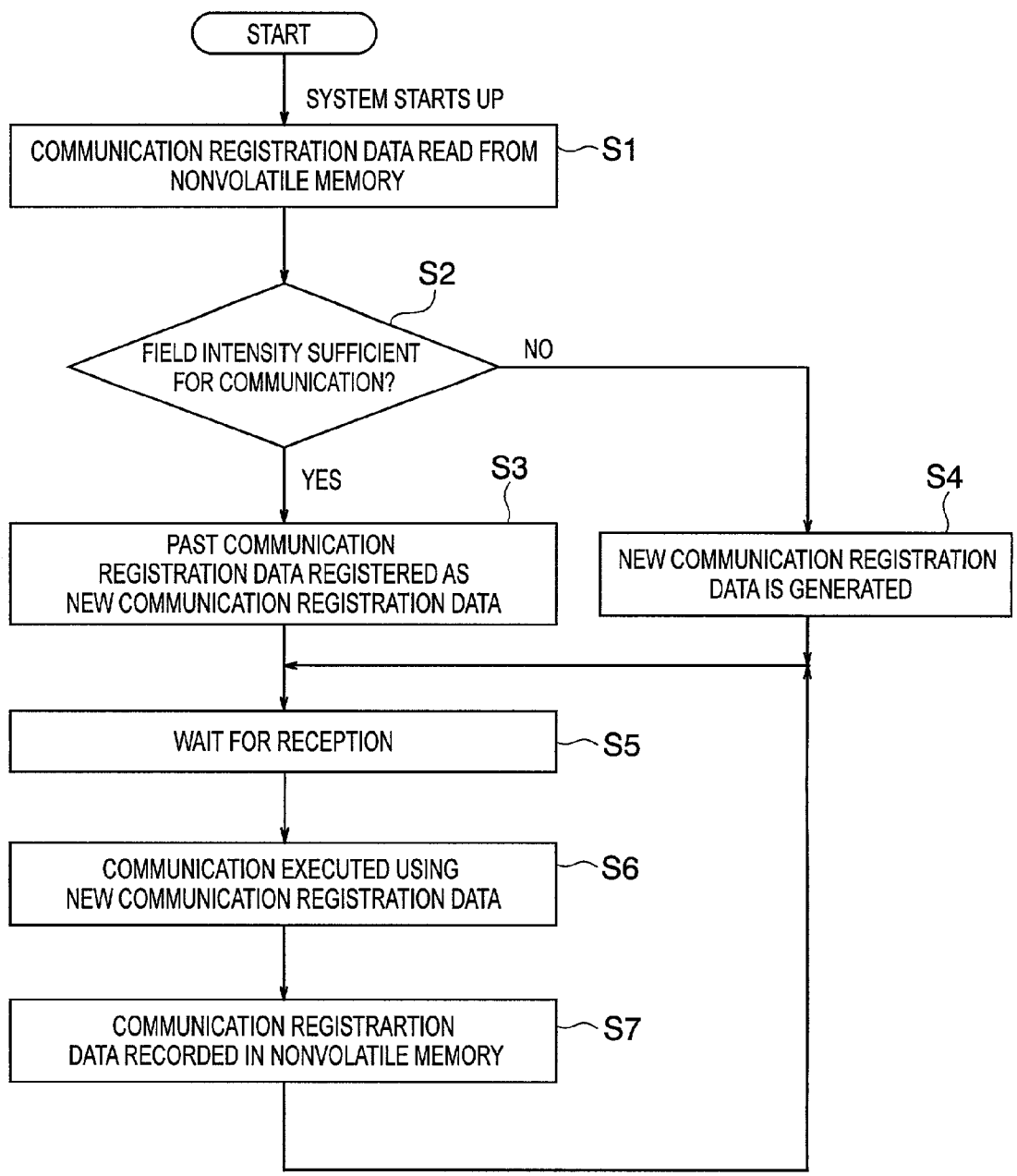
FIG. 2 is a flow chart showing operation of the narrow band communication vehicle-mounted apparatus.

FIG. 2 is a flow chart showing operation of the narrow band communication vehicle-mounted apparatus. Operation of the narrow band communication vehicle-mounted apparatus 100 will be explained using FIG. 2. When the apparatus starts, the control microcomputer 4 of the narrow band communication vehicle-mounted apparatus 100 reads from the nonvolatile memory 5 communication registration identification data used when a previous communication was performed (Step S1).

After the apparatus has started, the control microcomputer 4 measures an output of the field intensity measuring portion for detecting radio field intensity (Step S2), and, if it is determined that the intensity permits communication, the communication registration identification data read from the nonvolatile memory 5 is used in communication regardless of an on-road device type (Step S3).

On the other hand, if an output of the field intensity measuring portion for detecting radio field intensity is measured and it is determined that the intensity does not permit communication, a communication registration identification data value is randomly generated and used in communication (Step S4).

Then, there is a wait for reception (Step S5), regular communication is executed (Step S6) and communication registration identification data is recorded after communication is finished (Step S7).

The narrow band communication vehicle-mounted apparatus 100, that is, the narrow band communication vehicle-mounted apparatus includes the antenna 1, the radiocommunication portion 2 for sending and receiving with an on-road device via the antenna 1, the field intensity measuring portion 3 for detecting a radio field intensity, the control microcomputer 4 for controlling various equipment and the nonvolatile memory 5, wherein the control microcomputer stores in the nonvolatile memory randomly generated communication registration identification data when communication is opened or when the apparatus starts up, and communication is performed using communication registration identification data stored in the nonvolatile memory in a case where the radio field intensity is in a communication range when the apparatus starts up (that is, when the vehicle is in a communication area when the apparatus starts up). Thus, by measuring the radio field intensity and confirming whether or not communication is possible in the area and controlling generation of communication registration identification data, it is possible to perform communication in which there are normally no discrepancies with on-road systems regardless of whether or not the apparatus has started.

Moreover, in the present embodiment, any timing is acceptable in Step S7 so long as it proceeds to Step S4.

Embodiment 2

Figure 3:
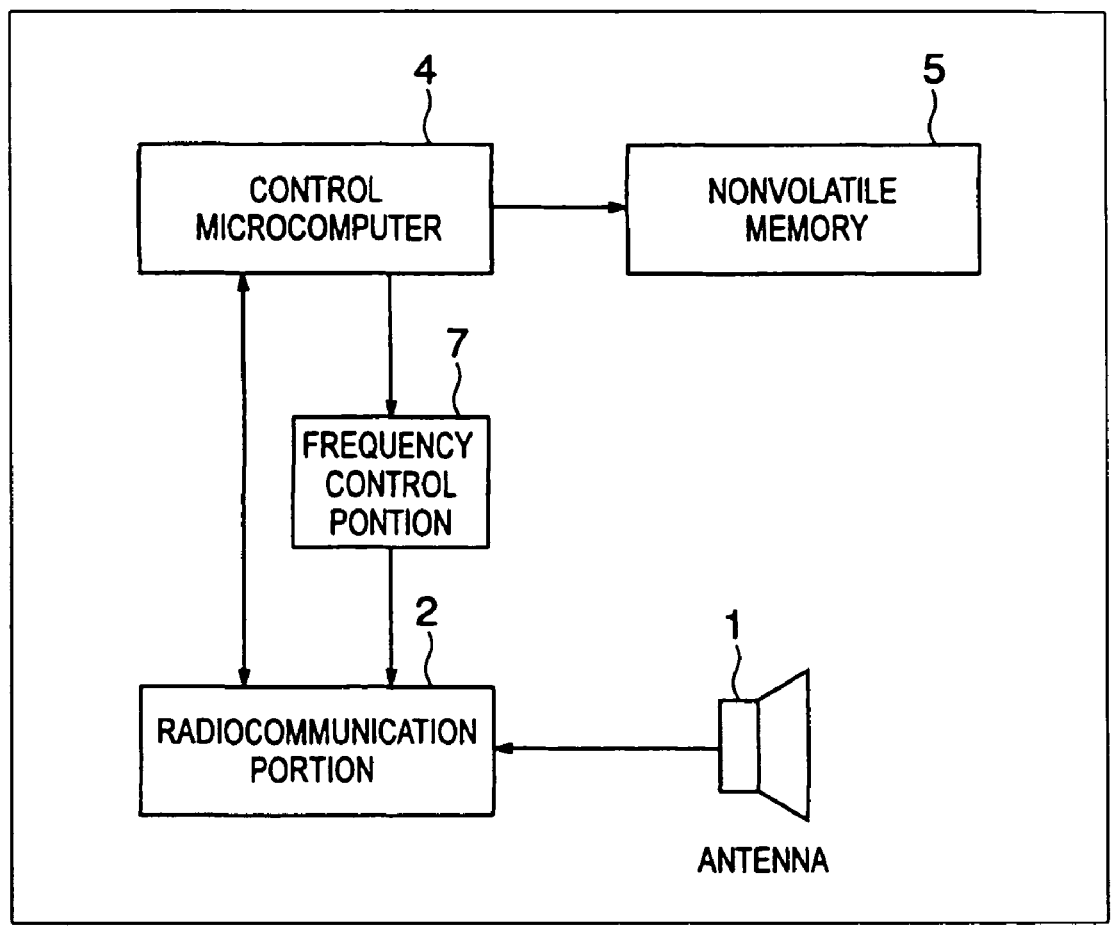
FIG. 3 is a block diagram showing another example of a narrow band communication vehicle-mounted apparatus according to the present embodiment.

FIG. 3 is a block diagram showing another example of a narrow band communication vehicle-mounted apparatus according to the present embodiment. In FIG. 3, a narrow band communication vehicle-mounted apparatus 200 includes an antenna 1, a radiocommunication portion 2 for sending and receiving with an on-road device via the antenna 1, a frequency control portion 7 for setting send and receive frequencies, a control microcomputer 4 for controlling various equipment and a nonvolatile memory 5.

Figure 4:
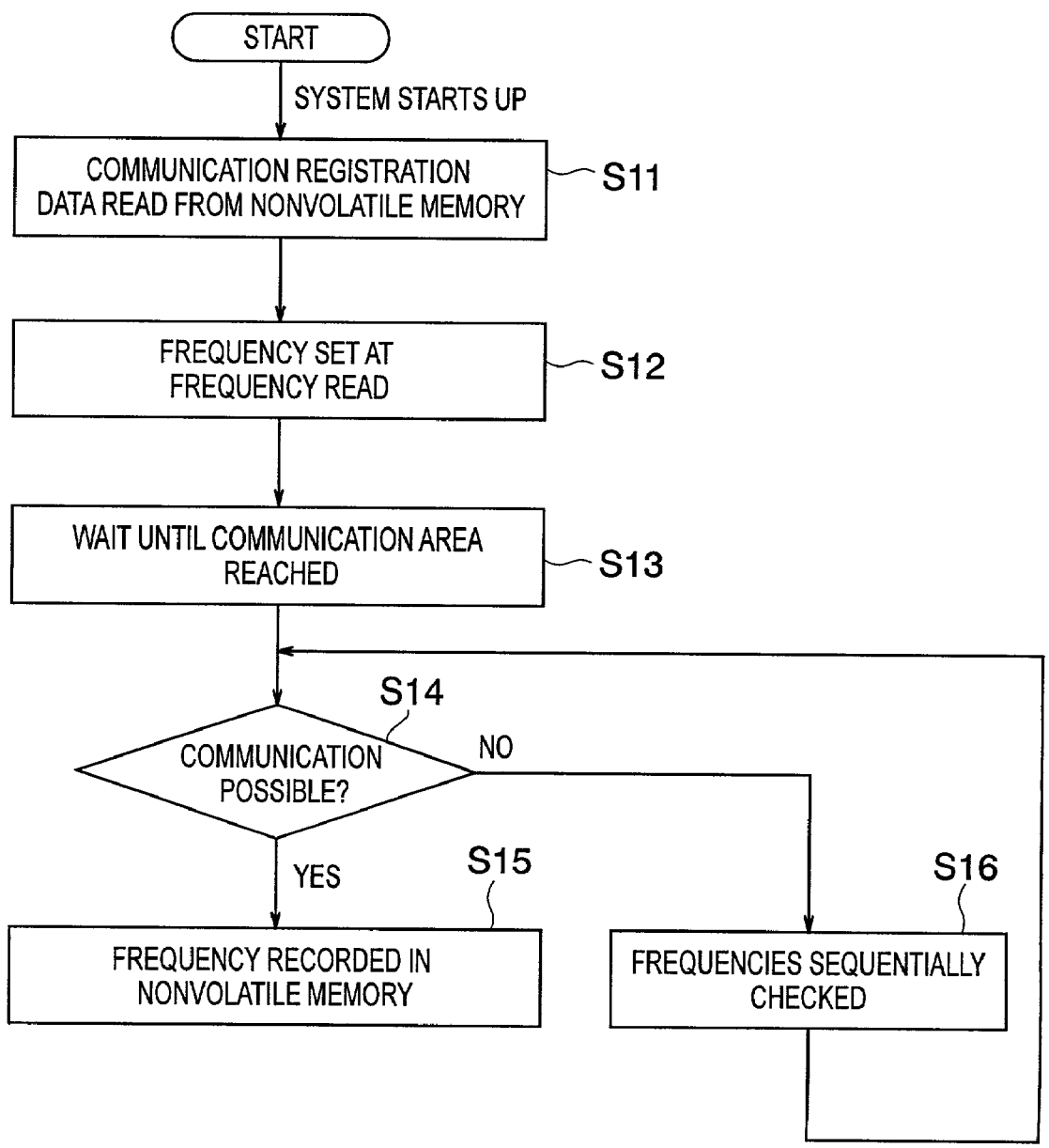
FIG. 4 is a flow chart showing operation of the narrow band communication vehicle-mounted apparatus.
Figure 5:
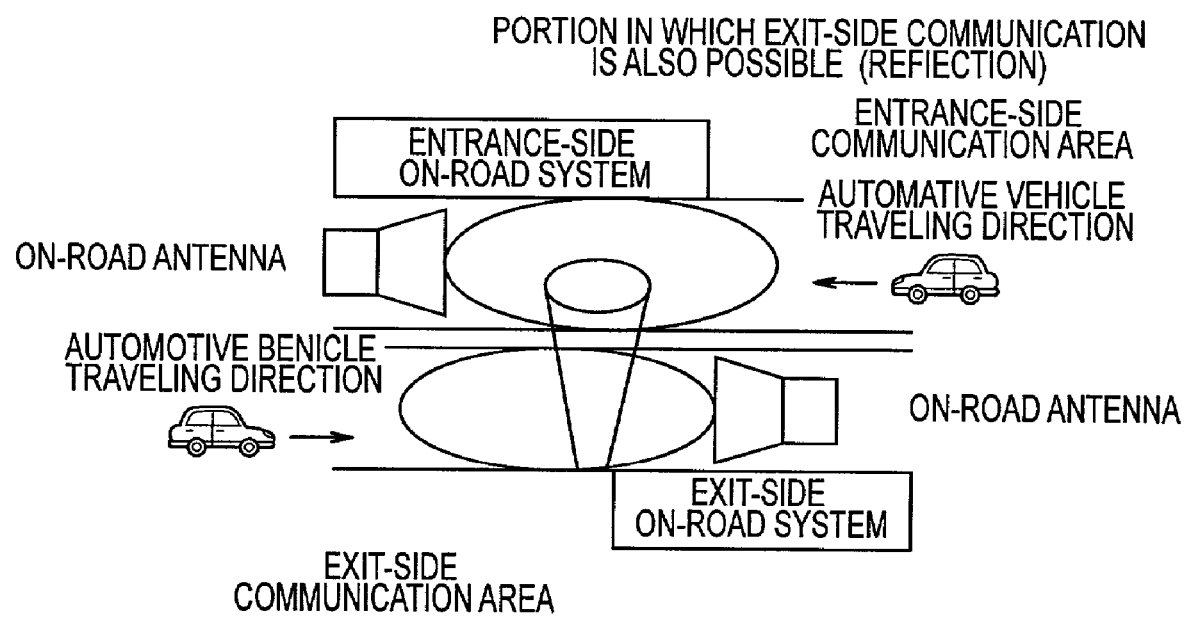
FIG. 5 is a diagram for explaining a condition in which waves are leaked into an area of an adjacent on-road device by reflection of the waves.

FIG. 4 is a flow chart showing operation of the narrow band communication vehicle-mounted apparatus. Operation of the narrow band communication vehicle-mounted apparatus 200 will be explained using FIG. 4. When the apparatus starts, the control microcomputer 4 of the narrow band communication vehicle-mounted apparatus 100 reads from the nonvolatile memory 5 a frequency used when a previous communication was performed (Step S11).

After the apparatus has started, a frequency read from the nonvolatile memory 5 is set as a first frequency (Step S12) and there is a wait until a communication area is reached (Step S13). When a communication area is reached, whether or not communication is possible at the set frequency is possible is determined (Step S14). If communication is possible, communication is commenced. After communication is finished, the frequency is stored in the nonvolatile memory 5 (Step S15).

On the other hand, if communication is not possible, the frequency is set at a next candidate and communication is tried. If communication is still not possible, the frequency is set at yet another candidate and communication is tried. That is, as in conventional examples, in accordance with a preset candidate procedure, if a first candidate is not capable of communication, a plurality of frequencies, second candidate and so on, are sequentially checked (Step S16, Step S14). Communication is opened when communication becomes possible and the frequency is saved in the nonvolatile memory 5 after communication is finished (Step S16).

The narrow band communication vehicle-mounted apparatus 200, that is, the narrow band communication vehicle-mounted apparatus includes the radiocommunication portion 2 for sending and receiving with an on-road device via the antenna 1, the frequency control portion 7 for setting send and receive frequencies, the control microcomputer 4 for controlling various equipment and the nonvolatile memory 5, wherein the control microcomputer 5 saves in the nonvolatile memory 5 a radio frequency at which communication was performed, and communication is performed selecting the radio frequency saved in the nonvolatile memory as a first candidate when the apparatus starts up. Hence, when the apparatus starts up, it is possible to perform communication with an available on-road device regardless of the start condition of the apparatus by making the frequency stored in the nonvolatile memory a first candidate in the frequency selection sequence.

According to one aspect of the present invention there is provided a narrow band communication vehicle-mounted apparatus comprising: a radiocommunication portion for sending and receiving with an on-road device via an antenna, a field intensity measuring portion for detecting a radio field intensity, a control microcomputer for controlling various equipment and a nonvolatile memory, wherein the control microcomputer stores in the nonvolatile memory randomly generated communication registration identification data when communication is opened or when the apparatus starts up, and communication is performed using communication registration identification data stored in the nonvolatile memory in a case where the radio field intensity is in a communication range when the apparatus starts up. Thus, by measuring the radio field intensity and confirming whether or not there is communication is possible in the area and controlling generation of communication registration identification data, it is possible to perform communication in which there are normally no discrepancies with on-road systems regardless of whether or not the apparatus has started.

Also, according to another aspect of the present invention there is provided a narrow band communication vehicle-mounted apparatus comprising: a radiocommunication portion for sending and receiving with an on-road device via an antenna, a frequency control portion for setting send and receive frequencies, a control microcomputer for controlling various equipment and a nonvolatile memory, wherein the control microcomputer saves in the nonvolatile memory a radio frequency at which communication was performed, and communication is performed selecting the radio frequency saved in the nonvolatile memory as a first candidate when the apparatus starts up. Hence, when the apparatus starts up, it is possible to perform communication with an available on-road device regardless of the start condition of the apparatus by making the frequency stored in the nonvolatile memory a first candidate in the frequency selection sequence.

What is claimed is:

1. A narrow band communication vehicle-mounted apparatus comprising: a radio-communication portion for sending and receiving with an on-road device via an antenna, a field intensity measuring portion for detecting a radio field intensity, a control microcomputer for controlling various equipment and a nonvolatile memory, wherein said control microcomputer stores in said nonvolatile memory randomly generated communication registration identification data when communication is opened or when said apparatus starts up, and communication is performed using communication registration identification data stored in said nonvolatile memory in a case where said radio field intensity is in a communication range when said apparatus starts up, wherein said randomly generated communication registration identification data is generated based on the field intensity measured by the field intensity measuring portion, and wherein said narrow band communication vehicle-mounted apparatus is mounted to a vehicle.

2. The narrow band communication vehicle-mounted apparatus according to claim 1, wherein said control microcomputer stores in said nonvolatile memory randomly generated communication registration identification data only when said apparatus starts up.

3. The narrow band communication vehicle-mounted apparatus according to claim 2, wherein said randomly generated communication registration identification data is generated when the measured field intensity indicates that said apparatus is out of communications range.

4. The narrow band communication vehicle-mounted apparatus according to claim 2, wherein said randomly generated communication registration identification data is not generated when the measured field intensity indicates that said apparatus is within communications range.

* * * * *